(12) United States Patent
Hasebe et al.

(10) Patent No.: US 6,705,627 B2
(45) Date of Patent: Mar. 16, 2004

(54) SUSPENSION ARM MOUNTING ARRANGEMENT

(75) Inventors: Yutaka Hasebe, Kanagawa (JP); Ryouzou Ikeuchi, Kanagawa (JP); Takeo Ehara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 37 days.

(21) Appl. No.: 10/128,348

(22) Filed: Apr. 24, 2002

(65) Prior Publication Data

US 2002/0180171 A1 Dec. 5, 2002

(30) Foreign Application Priority Data

Jun. 5, 2001 (JP) .................... 2001-169365

(51) Int. Cl.7 .............................................. B60G 7/02
(52) U.S. Cl. .............................................. 280/124.134
(58) Field of Search .................. 280/784, 124.134, 280/124.135, 124.136, 124.138, 124.139, 124.145, 124.146

(56) References Cited

U.S. PATENT DOCUMENTS

| | | | | |
|---|---|---|---|---|
| 4,132,430 A | * | 1/1979 | Bantle | 280/124.136 |
| 4,720,120 A | * | 1/1988 | Shimatani et al. | 280/124.134 |
| 5,098,118 A | * | 3/1992 | Hayashi et al. | 280/124.134 |
| 5,362,090 A | * | 11/1994 | Takeuchi | 280/124.146 |
| 5,601,304 A | * | 2/1997 | Tilly et al. | 280/124.15 |
| 5,607,177 A | * | 3/1997 | Kato | 280/124.134 |

FOREIGN PATENT DOCUMENTS

| | | | | |
|---|---|---|---|---|
| JP | 11063058 A | * | 3/1999 | F16F/1/38 |
| JP | 11-268510 | | 10/1999 | |

* cited by examiner

Primary Examiner—Peter C. English
(74) Attorney, Agent, or Firm—Foley & Lardner

(57) ABSTRACT

A suspension arm mounting arrangement for a vehicle, including a suspension arm having a rear end relative to a fore-and-aft direction of the vehicle. A pin extends from the rear end of the suspension arm in a rearward direction of the vehicle. An elastomer bushing supporting the pin includes an outer cylindrical member substantially coaxially extending with the pin. The elastomer bushing is adapted to be secured to a body of the vehicle. A stop is positioned forwardly apart from the outer cylindrical member and projects in a downward direction of the vehicle to be opposed to the outer cylindrical member.

17 Claims, 9 Drawing Sheets

SUSPENSION ARM MOUNTING ARRANGEMENT

BACKGROUND OF THE INVENTION

The present invention relates to a suspension arm for upward and downward swingably supporting wheels of a vehicle, and more specifically to an arrangement for mounting the suspension arm to the vehicle body.

Japanese Patent Application First Publication No. 11-268510 discloses an arrangement for mounting a suspension arm to a vehicle body such as a suspension member. The suspension arm is supported by elastomer bushings at front and rear mount portions spaced in a fore-and-aft direction of the vehicle body. At the rear mount portion, a pin extending from a rear end of the suspension arm in the rearward direction of the vehicle body is received and supported by the elastomer bushing.

SUMMARY OF THE INVENTION

However, if an impact force is applied to such a suspension arm mounting arrangement as described in the related art from a front of the vehicle body upon occurrence of vehicle front collision, the suspension member will be collapsed and rearward moved. Then, the suspension arm will be forced to move relatively rearward so as to reduce the space between the front and rear mount portions. The rearward movement of the suspension arm will cause an elastomeric member of the elastomer bushing to be fractured, causing the pin to be rearward displaced. In this case, if a vehicle body frame such as a dash panel is located on a rear side of the suspension arm, it will be required to ensure a sufficient space between the rear end of the suspension arm and the vehicle body frame in order to prevent the pin from being impinged against the vehicle body frame. However, such an arrangement of the suspension arm and the vehicle body frame will be undesirable from the viewpoint of space saving.

It would therefore be desirable to provide an arrangement for mounting a suspension arm to a vehicle body, in which when an impact force applied to the suspension arm, a pin provided at a rear mount portion of the suspension arm can be prevented from being contacted with a vehicle body frame without requiring a large space between the pin and the vehicle frame member. The arrangement therefore can serve for space saving. Further, in the arrangement, the suspension arm can be deformed such that the pin is oriented toward a downward direction of the vehicle body upon application of the impact force to the suspension arm. The arrangement therefore can serve for absorbing the impact energy produced upon vehicle collision.

In one aspect of the present invention, there is provided a suspension arm mounting arrangement for a vehicle, the arrangement comprising:

a suspension arm having a rear end relative to a fore-and-aft direction of the vehicle;

a pin extending from said rear end of said suspension arm in a rearward direction of the vehicle;

an elastomer bushing supporting said pin, said elastomer bushing including an outer cylindrical member substantially coaxially extending with said pin, said elastomer bushing being adapted to be secured to a body of the vehicle; and a stop positioned forwardly apart from said outer cylindrical member and projecting in a downward direction of the vehicle to be opposed to said outer cylindrical member.

In a further aspect of the present invention, there is provided a suspension arm mounting arrangement for a vehicle, the arrangement comprising:

a suspension arm extending in a fore-and-aft direction of the vehicle and having a rear mount portion;

elastic support means for elastically supporting said rear mount portion of said suspension arm relative to a body of the vehicle, said elastic support means including an outer cylindrical member adapted to be secured to the body of the vehicle; and stop means for cooperating with said outer cylindrical member to limit displacement of said rear mount portion in a rearward direction of the vehicle.

DETAILED DESCRIPTION OF THE PREFERRED EMBODIMENT

Figure 1:
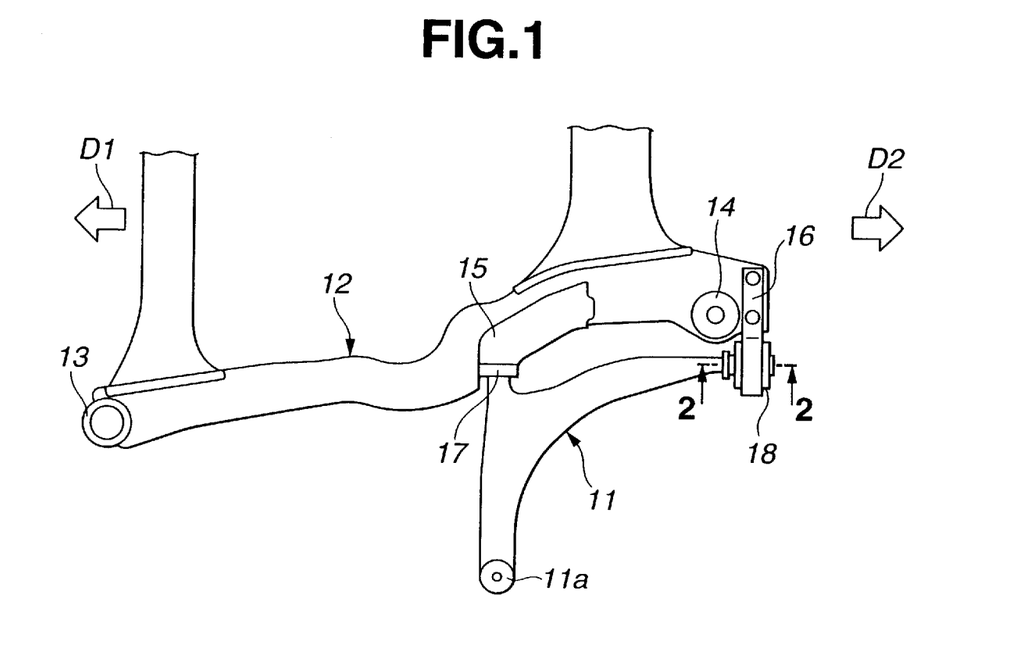
FIG. 1 is a top plan view of an arrangement for mounting a suspension arm to a vehicle body, according to a first embodiment of the present invention, showing a suspension arm for a left-front wheel.
Figure 2:
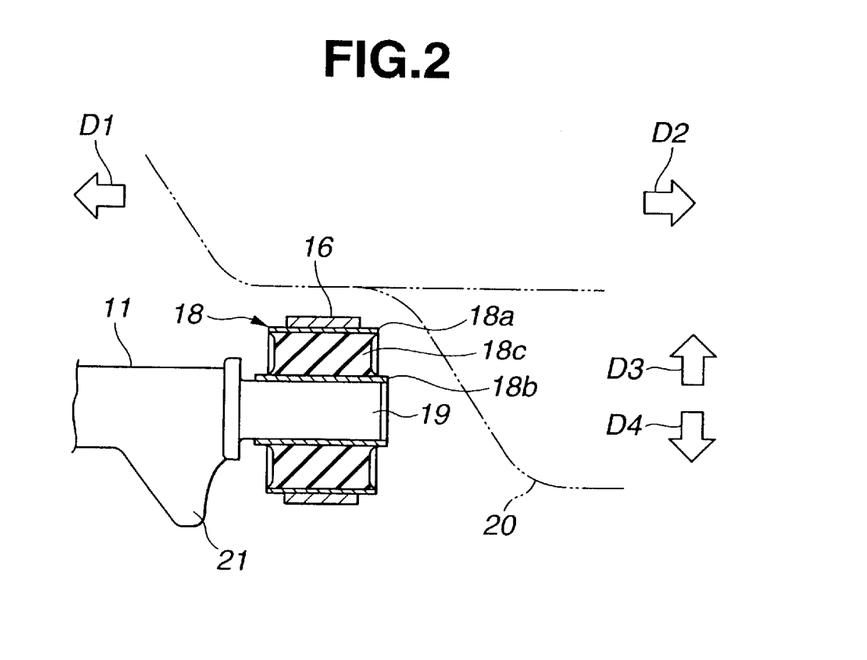
FIG. 2 is a partial cross-section of the suspension arm, taken along line 2—2 of FIG. 1.

Referring now to FIGS. 1–2, there is shown a suspension arm mounting arrangement for a vehicle, according to a first embodiment of the present invention. In this embodiment, explanation is made as to a suspension arm for a left-front wheel. As illustrated in FIG. 1, there are shown subframe 12 as a suspension member extending in a fore-and-aft direction of the vehicle. In FIG. 1, D1 denotes the forward direction of the vehicle, and D2 denotes the rearward direction thereof. Subframe 12 is mounted to a vehicle body frame, not shown, by insulators 13 and 14. Suspension arm 11 having a generally L-shape in plan view as shown in FIG. 1, includes front and rear mount portions spaced from each other in the fore-and-aft direction of the vehicle, at which suspension arm 11 is mounted to subframe 12 by front and rear bushings 17 and 18. Front elastomer bushing 17 disposed at the front mount portion of suspension arm 11 and rear elastomer bushing 18 disposed at the rear mount portion are secured to subframe 12 by brackets 15 and 16, respectively. Suspension arm 11 is thus supported by front and rear elastomer bushings 17 and 18 so as to be swingable in upward and downward directions of the vehicle body. Suspension arm 11 has front end 11a spaced from the front mount portion in a lateral direction of the vehicle extending substantially perpendicular to the fore-and-aft direction, to which the left-front wheel is mounted.

The arrangement at the rear mount portion of suspension arm 11 will be in detail explained hereinafter. As illustrated in FIG. 2, pin 19 is supported by rear elastomer bushing 18 at the rear mount portion of suspension arm 11. Pin 19 extends from a rear end of suspension arm 11 in rearward direction D2 of the vehicle. Rear elastomer bushing 18 includes outer cylindrical member 18a, inner cylindrical member 18b and annular-shaped elastomeric member 18c disposed between outer and inner cylindrical members 18a and 18b. Outer cylindrical member 18a is held in position by bracket 16 which is secured to subframe 12. Outer cylindrical member 18a extends substantially coaxially with pin 19. Inner cylindrical member 18b receives pin 19 extending therethrough. Disposed on a front side of rear elastomer bushing 18 is downward stop 21 which is operative to contact with outer cylindrical member 18a to limit rearward displacement of pin 19. Specifically, downward stop 21 is provided in the form of projection extending from an outer peripheral surface of suspension arm 11 in downward direction D4 of the vehicle, namely, perpendicular to an axial direction of outer cylindrical member 18a. Downward stop 21 is positioned apart from a front end of outer cylindrical member 18a in forward direction D1 of the vehicle and opposed to a lower portion of an outer circumferential surface of the front end of outer cylindrical member 18a. Downward stop 21 has a sufficient downward length to face the lower portion of the front end surface of outer cylindrical member 18a. As shown in FIG. 2, downward stop 21 extends from suspension arm 11 further downward than a lowermost portion of the front end surface of outer cylindrical member 18a at the front end thereof. In this embodiment, downward stop 21 is integrally formed with suspension arm 11.

Figure 3:
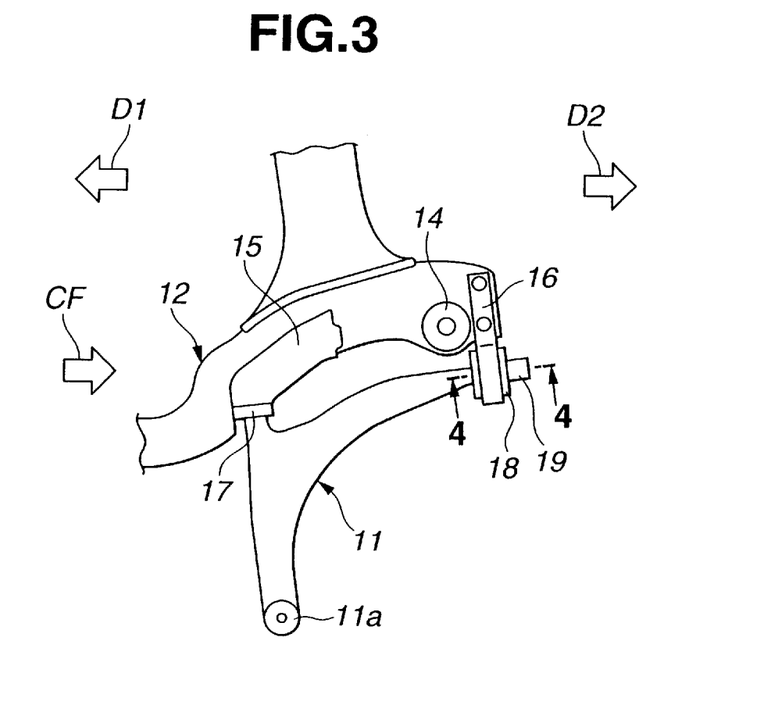
FIG. 3 is a top plan view of the suspension arm undergoing deformation due to vehicle collision.
Figure 4:
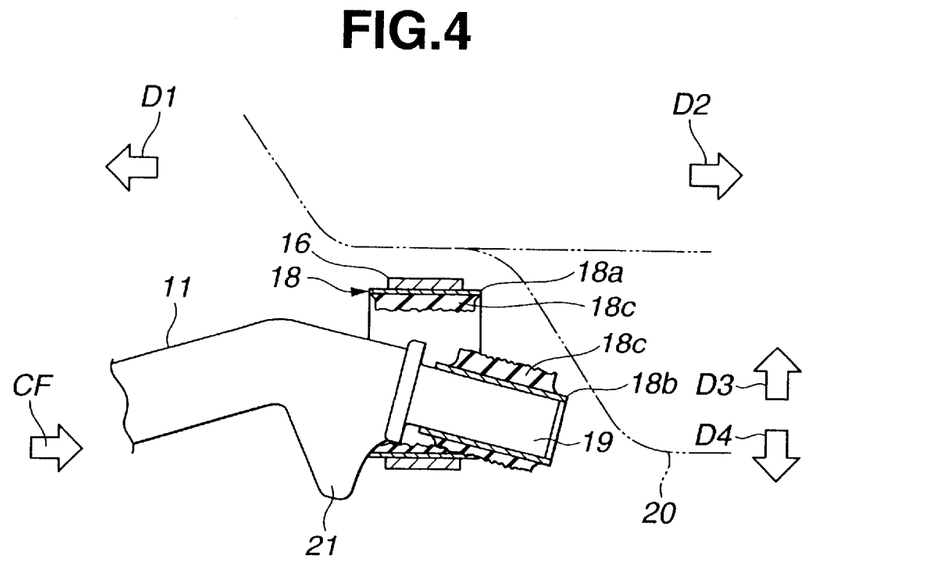
FIG. 4 is a partial cross-section taken along line 4—4 of FIG. 3.

Referring to FIGS. 3 and 4, deformation of suspension arm 11 upon occurrence of vehicle front collision will be explained hereinafter. Downward stop 21 cooperates with outer cylindrical member 18a to deform suspension arm 11 in such a manner that the rear mount portion is oriented toward a predetermined direction of the vehicle. Specifically, as illustrated in FIG. 3, impact force CF caused by the vehicle front collision is applied to subframe 12 from the front side of the vehicle. Subframe 12 is collapsed and forced to move in rearward direction D2 by impact force CF. Suspension arm 11 is then forced to move in rearward direction D2 so as to reduce the distance between the front and rear mount portions, namely, the distance between front and rear elastomer bushings 17 and 18. Due to the rearward movement of suspension arm 11, elastomeric member 18c of rear elastomer bushing 18 is fractured and downward stop 21 is forcedly contacted with the front end of outer cylindrical member 18a, as shown in FIG. 4. By the contact between downward stop 21 and outer cylindrical member 18a, suspension arm 11 and pin 19 are prevented from further moving in rearward direction D2. In this state, a rotation moment is produced about a fulcrum located at the contact portion of downward stop 21 and outer cylindrical member 18a. Suspension arm 11 is deformed by the rotation moment to bend in such a manner that pin 19 is downward oriented as shown in FIG. 4. In the deformed state of suspension arm 11, pin 19 is downwardly inclined relative to the axial direction of outer cylindrical member 18a. This deformation of suspension arm 11 can absorb the impact energy caused by the vehicle collision. Further, since the rearward displacement of pin 19 from the position shown in FIG. 4 can be prevented, contact or interference between pin 19 and dash lower panel 20 can be avoided.

With the above-described arrangement of the invention, upon occurrence of the vehicle collision, the impact energy can be absorbed by such a deformation of suspension arm 11 as explained above. Further, pin 19 can be prevented from rearward moving from the position shown in FIG. 4, so that contact or interference between pin 19 and a vehicle body frame such as dash lower panel 20 can be inhibited. Therefore, it will not be required to increase a space between the rear end of suspension arm 11 and the vehicle body frame in order to avoid the contact between pin 19 and the vehicle body frame. As a result, such a contact can be suppressed without adversely affecting the space saving.

Figure 5:
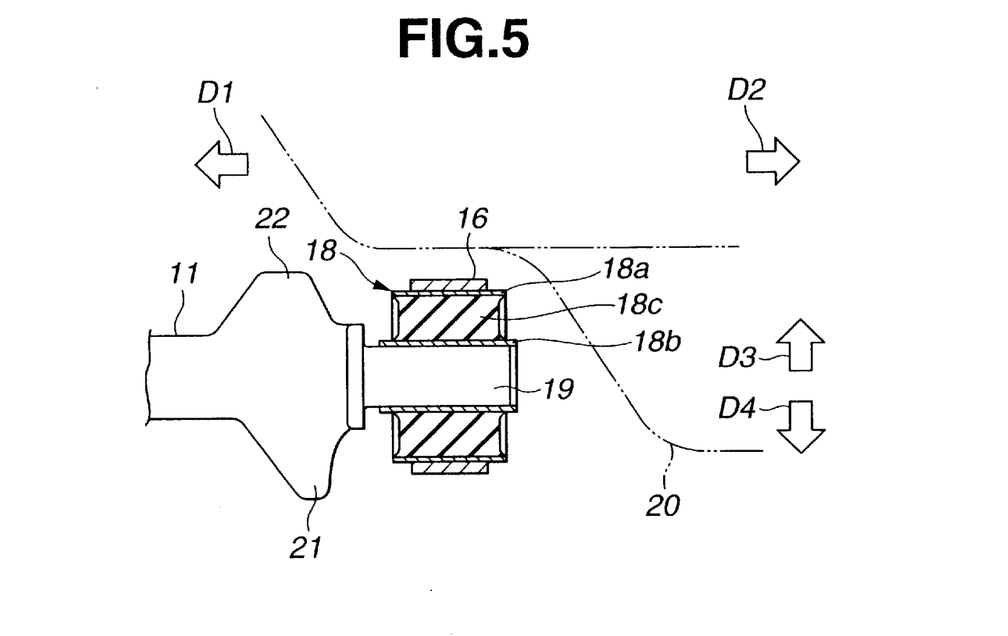
FIG. 5 is a view similar to FIG. 2, but showing the arrangement of the second embodiment of the present invention.
Figure 6:
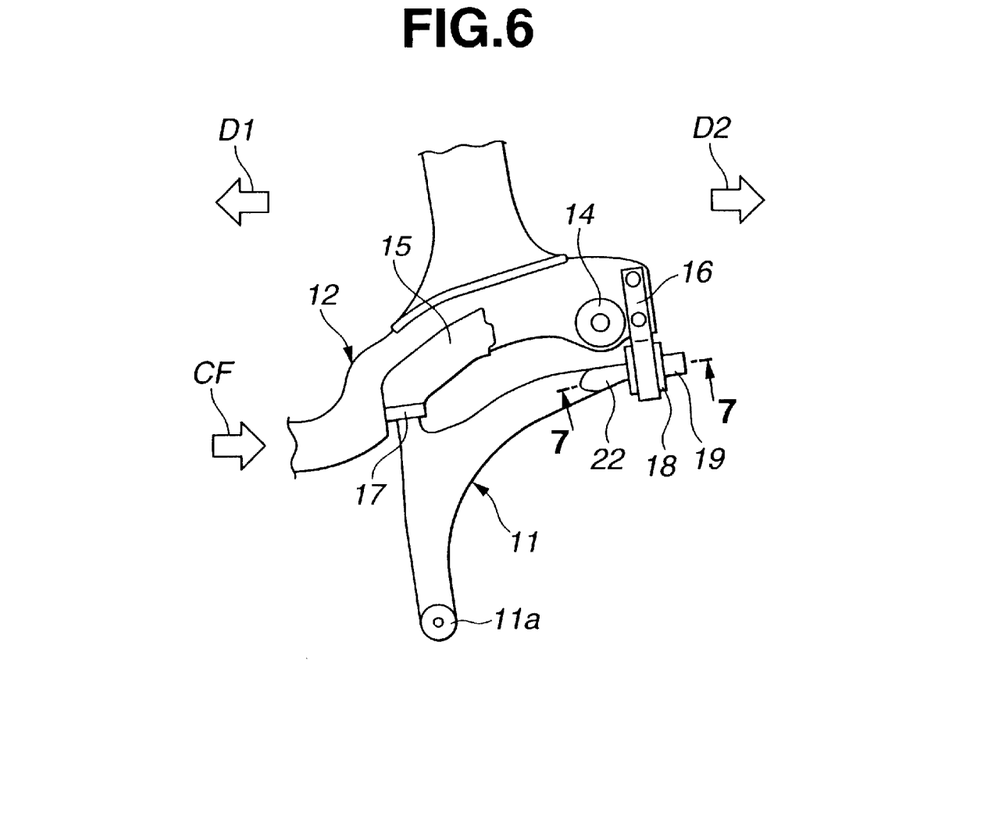
FIG. 6 is a view similar to FIG. 3, but showing the arrangement of the second embodiment.
Figure 7:
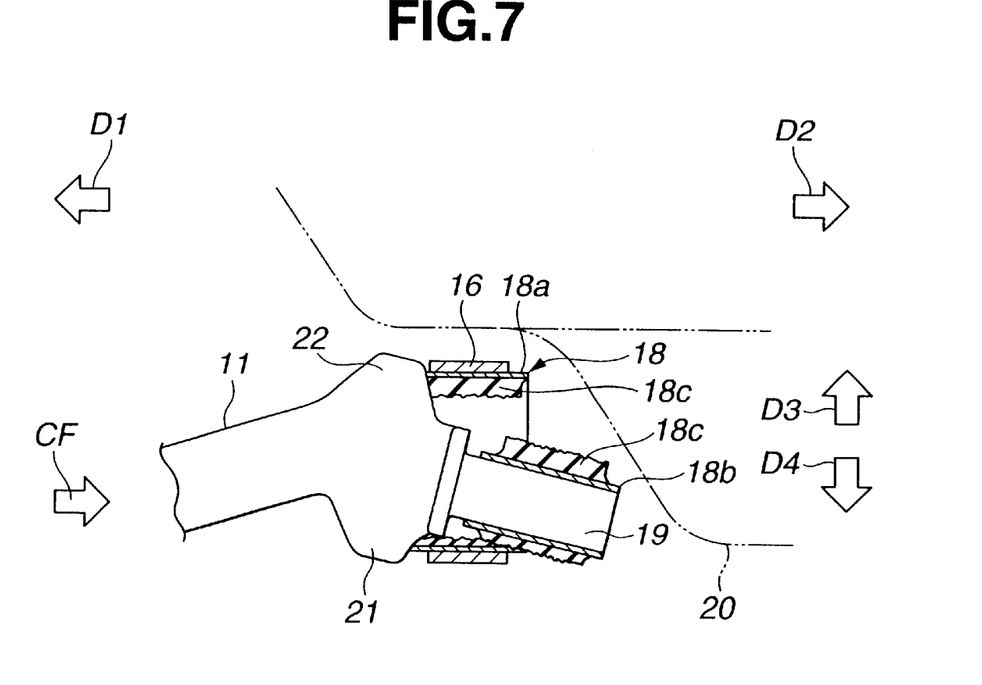
FIG. 7 is a partial cross-section taken along line 7—7 of FIG. 6.

Referring to FIGS. 5–7, the arrangement of a second embodiment of the present invention will be explained hereinafter, which differs in provision of upward stop 22 from the first embodiment. Like reference numerals denote like parts, and therefore, detailed descriptions therefor are omitted. As illustrated in FIG. 5, upward stop 22 is positioned forwardly apart from the front end of outer cylindrical member 18a and projects from the outer peripheral surface of suspension arm 11 in upward direction D3 of the vehicle to be opposed to an upper portion of the front end surface of outer cylindrical member 18a. Upward stop 22 is spaced from the front end of outer cylindrical member 18a by a larger distance than a distance between downward stop 21 and the front end of outer cylindrical member 18a. In this embodiment, downward stop 21 and upward stop 22 are integrally formed with suspension arm 11.

When vehicle front collision occurs, impact force CF is applied from the front side of the vehicle to subframe 12 as shown in FIG. 6. Subframe 12 and suspension arm 11 are moved rearward and deformed by impact force CF in the same manner as explained in the first embodiment. As a result, as shown in FIG. 7, suspension arm 11 is conditioned in the bent state, and elastomeric member 18c of rear elastomer bushing 18 is conditioned in the fractured state. If downward stop 21 has a relatively smaller downward length and is urged into a fracture opening of elastomeric member 18c under this condition, upward stop 22 will be contacted with the upper portion of the front end surface of outer cylindrical member 18a so that downward stop 21 can be prevented from entering and passing through the fracture opening of elastomeric member 18c. Pin 19 therefore can be prevented from contact with dash lower panel 20. Suspension arm 11 is brought into the deformed state as shown in FIG. 7, whereby the impact energy caused upon the vehicle collision can be absorbed.

With the arrangement of the second embodiment, even in a case where the downward length of downward stop 21 is relatively small, the contact or interference between pin 19 and the vehicle body frame can be prevented. Therefore, the same effects as described in the first embodiment can be ensured.

Figure 8:
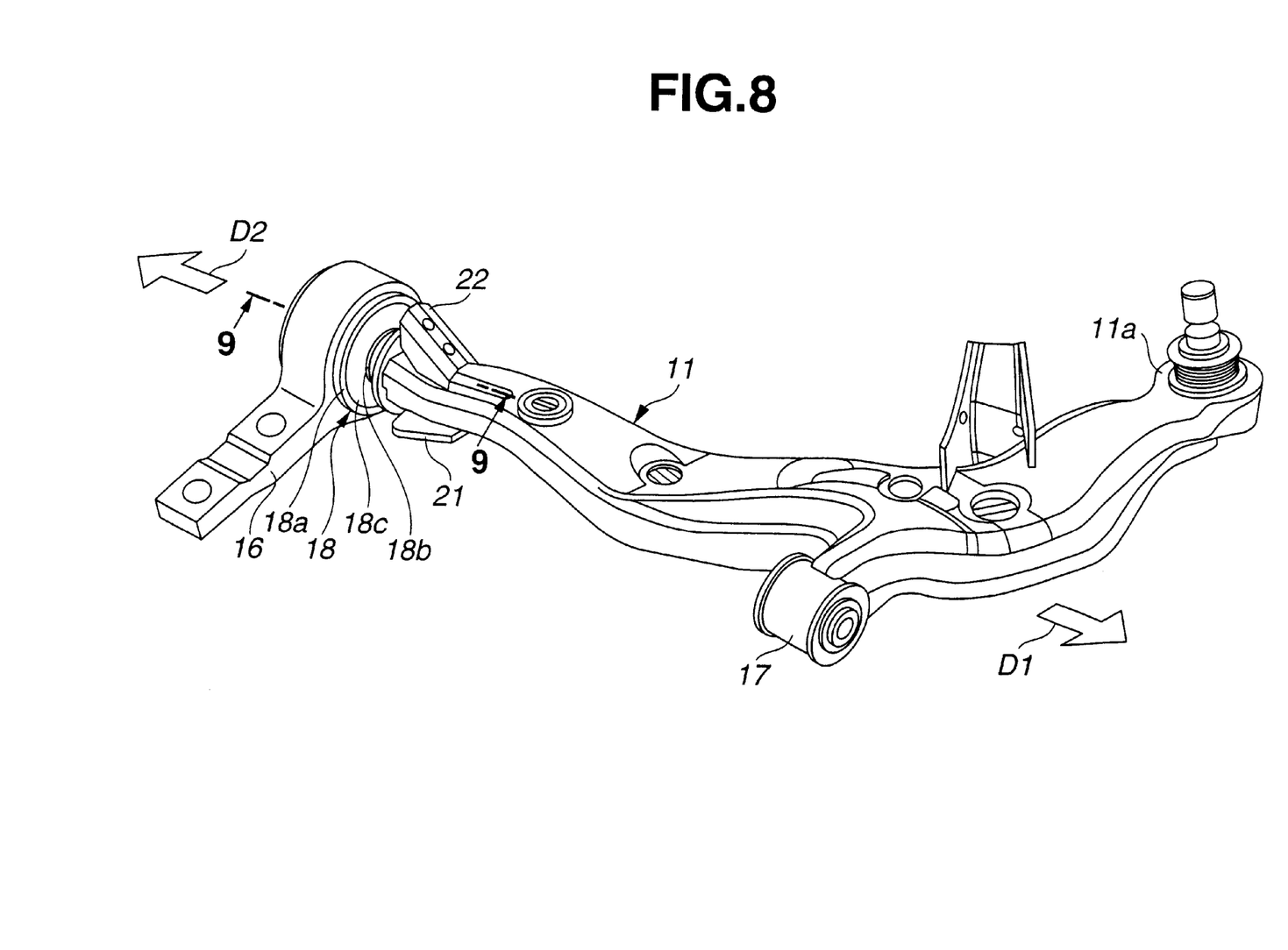
FIG. 8 is a perspective view of the arrangement of a third embodiment of the present invention.
Figure 9:
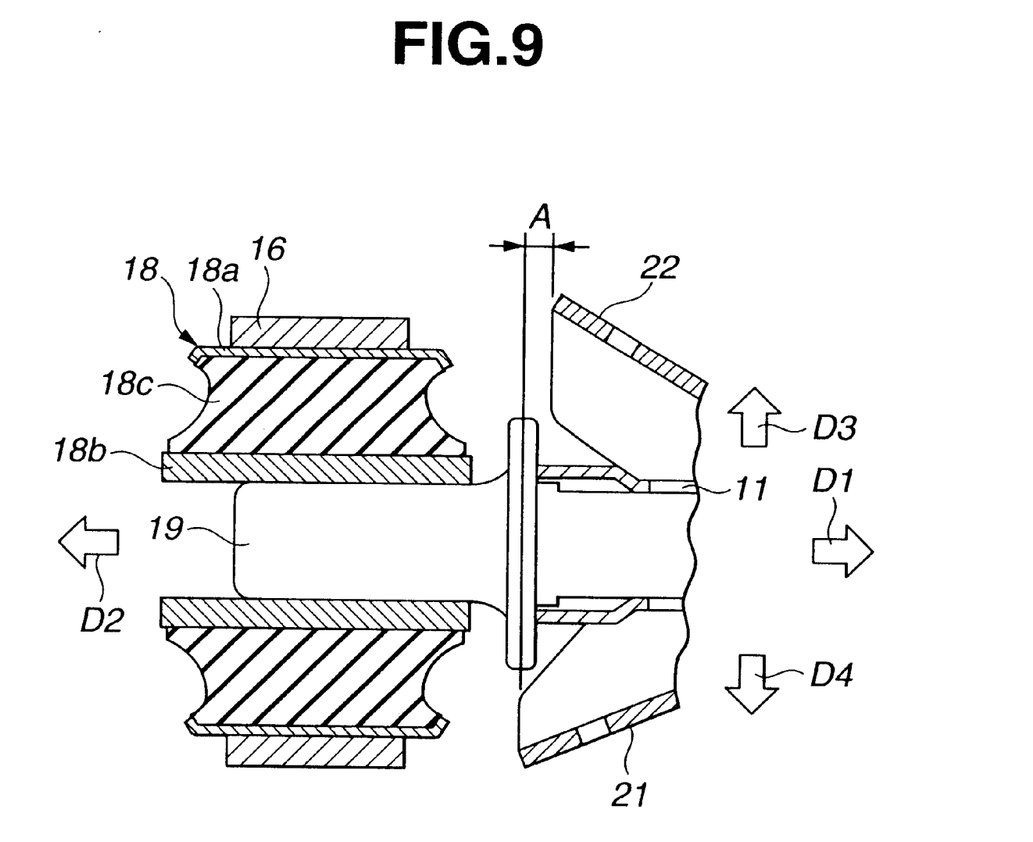
FIG. 9 is a partial cross-section taken along line 9—9 of FIG. 8.

Referring to FIGS. 8–9, the arrangement of a third embodiment of the present invention will be explained hereinafter. As illustrated in FIGS. 8–9, downward stop 21 and upward stop 22 are separate members and joined with suspension arm 11 by a suitable means such as welding. Downward stop 21 is connected with a lower-side surface of suspension arm 11, and upward stop 22 is connected with an upper-side surface of suspension arm 11. As illustrated in FIG. 9, upward stop 22 is located forward relative to downward stop 21. There is distance A between a rear end of downward stop 21 and a rear end of upward stop 22. In the third embodiment, the same effects as described in the first and second embodiments can be obtained.

Figure 10:
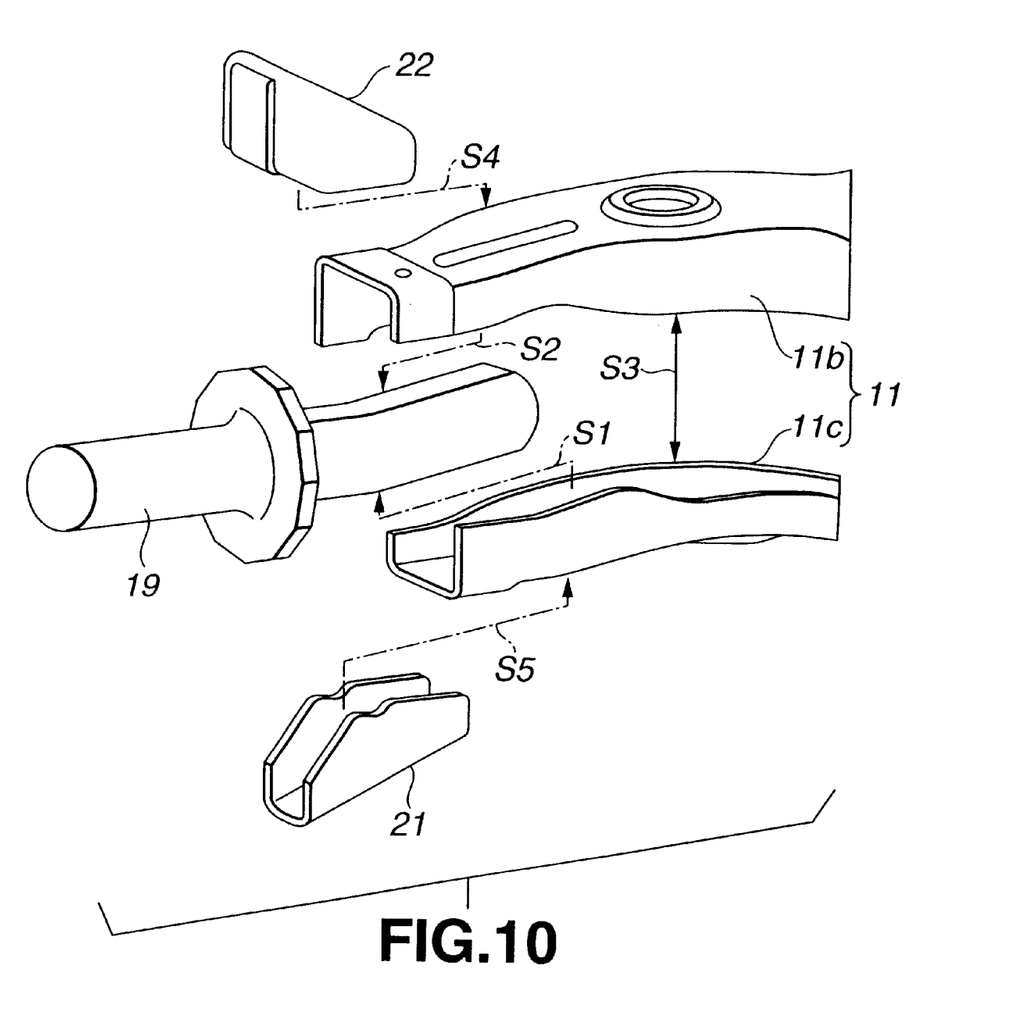
FIG. 10 is an exploded perspective view of the arrangement of a fourth embodiment of the present invention, showing a rear portion of the arrangement.

Referring to FIG. 10, the arrangement of a fourth embodiment of the present invention will be explained hereinafter. In this embodiment, suspension arm 11 includes upper and lower halves 11b and 11c split from each other in an up-and-down direction of the vehicle, namely, in substantially a vertical direction of the vehicle. Upper and lower halves 11b and 11c are formed by pressing. Downward stop 21 and upward stop 22 are fixed to upper and lower halves 11b and 11c, respectively. Downward stop 21 and upward stop 22 are formed by pressing.

A method for making the arrangement of this embodiment is explained below by referring to FIG. 10. First, at step S1, pin 19 is welded to lower half 11c of suspension arm 11. Next, at step S2, pin 19 joined with lower half 11c is welded to upper half 11b of suspension arm 11. Then, at step S3, upper and lower halves 11b and 11c are welded together to interpose pin 19 therebetween and thus form a unitary body of suspension arm 11 and pin 19. Subsequently, at step S4, upward stop 22 is welded to upper half 11b, and at step S5, downward stop 21 is welded to lower half 11c. According to the method, suspension arm 11 having pin 19 can be readily produced as one unit. Further, since upper and lower halves 11b and 11c and downward and upward stops 21 and 22 are readily formed by pressing, the production cost can be reduced.

Figure 11:
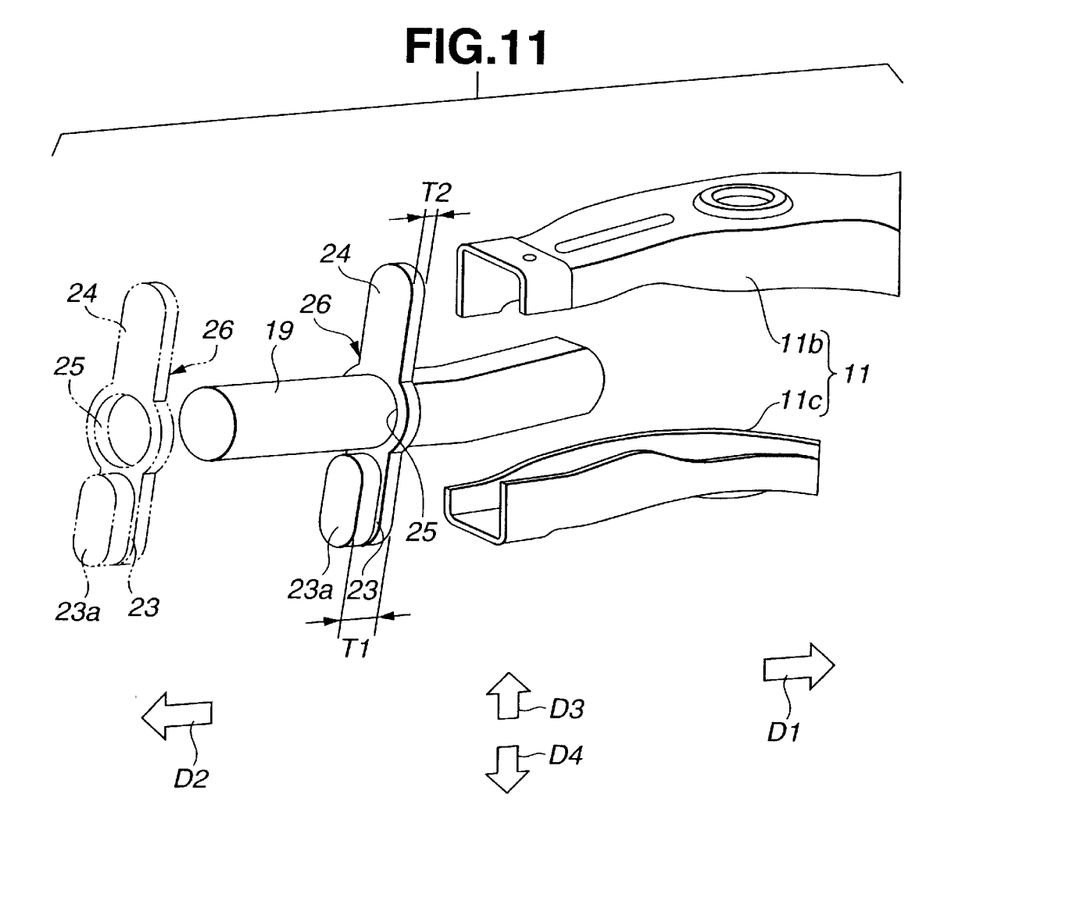
FIG. 11 is a view similar to FIG. 10, but showing the arrangement of a fifth embodiment of the present invention.

Referring to FIG. 11, the arrangement of a fifth embodiment of the present invention will be explained hereinafter. This embodiment differs in that downward and upward stops are integrally formed into an integral stop, from the fourth embodiment described above. As illustrated in FIG. 11, integral stop 26 includes a central body having through-hole 25, downward stop 23 projecting downward from the central body, and upward stop 24 projecting upward from the central body. Integral stop 26 is mounted onto pin 19 by inserting pin 19 into through-hole 25 and then fixed to pin 19 in position. Downward and upward stops 23 and 24 are integrally formed with the central body. Downward stop 23 includes bulge portion 23a extending rearward, i.e. toward rear elastomer bushing 18. Downward stop 23 thus has thickness T1 in the fore-and-aft direction of the vehicle which is larger than thickness T2 of upward stop 24 in the same direction of the vehicle. Downward stop 23 with bulge portion 23a is located closer to outer cylindrical member 18a of rear elastomer bushing 18 than upward stop 24. With this arrangement, upon occurrence of vehicle collision, downward stop 23 can be earlier contacted with outer cylindrical member 18a than upward stop 24 is contacted therewith. Accordingly, the contact between pin 19 and the vehicle body frame can be suppressed, and absorption of impact energy can be attained by the deformation of suspension arm 11 as explained above. Integral stop 26 can be readily formed by pressing. This serves for reducing the number of parts and the production cost.

Upon making the arrangement of the fifth embodiment, integral stop 26 is fitted onto pin 19 via through-hole 25 and held in position and then welded to pin 19 to form one unit. In this embodiment, steps S1, S2 and S3 described in the fourth embodiment are conducted, but steps S4 and S5 described in the fourth embodiment can be omitted. This serves for simplifying the production method without limiting the welding order. Further, since there is no other parts at the welding portion in which upper and lower halves 11b and 11c of suspension arm 11 and pin 19 are welded together, all welding works can be simultaneously conducted. This can facilitate production of the arrangement and save the production cost.

Figure 12:
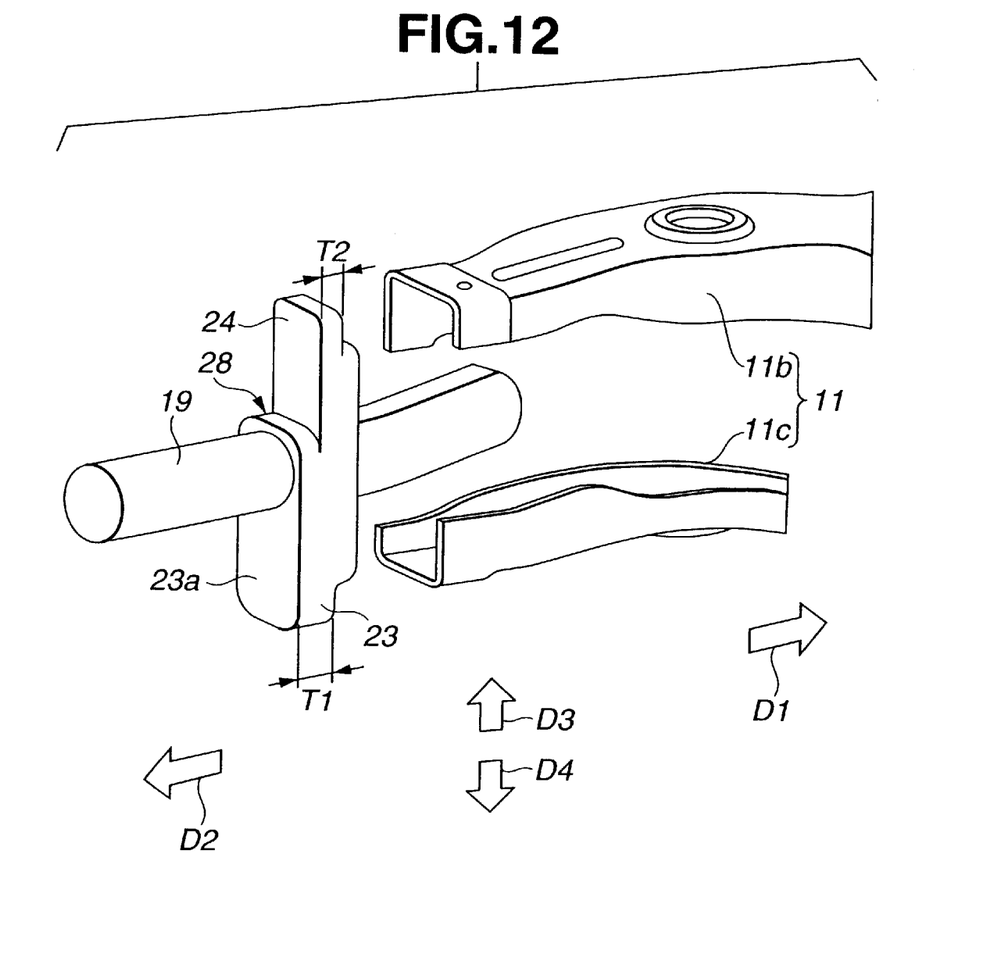
FIG. 12 is a view similar to FIG. 10, but showing the arrangement of a sixth embodiment of the present invention.

FIG. 12 shows the arrangement of a sixth embodiment of the present invention, which differs in that an integral stop is integrally formed with pin 19, from the fifth embodiment described above. As illustrated in FIG. 12, integral stop 28 having downward and upward stops 23 and 24 is integrally formed with pin 19. Downward and upward stops 23 and 24 project from pin 19 downwardly and upwardly, respectively. Bulge portion 23a of downward stop 23 surrounds a circumferential surface of pin 19 and extends rearward such that integral stop 28 has on the rear side thereof a stepped portion between bulge portion 23a and upward stop 24. Downward stop 23 has thickness T1 in the fore-and-aft direction of the vehicle which is larger than thickness T2 of upward stop 24. Downward stop 23 is thus located closer to outer cylindrical member 18a of rear elastomer bushing 18 than upward stop 24. In this embodiment, pin 19 and integral stop 28 form a unitary body, so that the number of parts and the cost can be further reduced and the production method will become much simpler. The same effects as described in the above embodiments can be obtained.

This application is based on prior Japanese Patent Application No. 2001-169365 filed on Jun. 5, 2001, the entire content of which is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A suspension arm mounting arrangement for a vehicle, the arrangement comprising:

a suspension arm having a rear end relative to a fore-and-aft direction of the vehicle;

a pin extending from said rear end of said suspension arm in a rearward direction of the vehicle;

an elastomer bushing supporting said pin, said elastomer bushing including an outer cylindrical member extending substantially coaxially with said pin, said elastomer bushing being adapted to be secured to a body of the vehicle;

a first stop positioned forward of and apart from said outer cylindrical member and projecting in a downward direction of the vehicle to be opposed to said outer cylindrical member; and a second stop positioned forward of and apart from said outer cylindrical member and projecting in an upward direction of the vehicle to be opposed to said outer cylindrical member, said second stop being spaced from said outer cylindrical member by a larger distance than a distance between the first stop and said outer cylindrical member.

2. The arrangement as claimed in claim 1, wherein said first and second stops are disposed on said suspension arm.

3. The arrangement as claimed in claim 1, wherein said first and second stops are disposed on said pin.

4. The arrangement as claimed in claim 1, wherein said suspension arm comprises an upper half and a lower half, said pin being interposed between said upper half and said lower half.

5. The arrangement as claimed in claim 1, wherein said upper and lower suspension arm halves and said pin are welded together to form a unitary body.

6. The arrangement as claimed in claim 1, wherein said first and second stops are integrally formed into an integral stop.

7. The arrangement as claimed in claim 6, wherein said integral stop has a mount hole through which said pin is inserted to support said integral stop.

8. The arrangement as claimed in claim 6, wherein said integral stop is integrally formed with said pin.

9. A suspension arm mounting arrangement for a vehicle, the arrangement comprising:

a suspension arm extending in a fore-and-aft direction of the vehicle and having a rear mount portion;

elastic support means for elastically supporting said rear mount portion of said suspension arm relative to a body of the vehicle, said elastic support means including an outer cylindrical member adapted to be secured to the body of the vehicle; and stop means for cooperating with said outer cylindrical member to limit displacement of said rear mount portion in a rearward direction of the vehicle, said stop means located on said rear mount portion, wherein said stop means cooperates with said outer cylindrical member to deform said suspension arm at said stop means in such a manner that said rear mount portion is oriented toward a predetermined direction of the vehicle.

10. The arrangement as claimed in claim 9, wherein said predetermined direction is a downwardly inclined direction of the vehicle.

11. The arrangement as claimed in claim 9, wherein said rear mount portion comprises a pin extending rearward and substantially coaxially with said outer cylindrical member.

12. The arrangement as claimed in claim 11, wherein said suspension arm comprises an upper half and a lower half, said pin being interposed between said upper half and said lower half.

13. The arrangement as claimed in claim 12, wherein said upper and lower suspension arm halves and said pin are welded together to form a unitary body.

14. A suspension arm mounting arrangement for a vehicle, the arrangement comprising:

a suspension arm extending in a fore-and-aft direction of the vehicle and having a rear mount portion;

elastic support means for elastically supporting said rear mount portion of said suspension arm relative to a body of the vehicle, said elastic support means including an outer cylindrical member adapted to be secured to the body of the vehicle; and stop means for cooperating with said outer cylindrical member, said stop means located on said rear mount portion, wherein said stop means and said outer cylindrical member are configured so that, when said stop means is in a forced contact with said outer cylindrical member, said stop means and said outer cylindrical member cause said suspension arm to be deformed by a rotation moment about a fulcrum located at a contact portion of said stop means with said outer cylindrical member in such a manner that the rear mount portion is oriented toward a predetermined direction of the vehicle.

15. The arrangement as claimed in claim 14, wherein said predetermined direction is a downwardly inclined direction of the vehicle.

16. A suspension arm mounting arrangement for a vehicle, the arrangement comprising:

a suspension arm having a rear end relative to a fore-and-aft direction of the vehicle;

a pin extending from said rear end of said suspension arm in a rearward direction of the vehicle;

an elastomer bushing supporting said pin, said elastomer bushing including an outer cylindrical member extending substantially coaxially with said pin, said elastomer bushing being adapted to be secured to a body of the vehicle;

a stop positioned forward of and apart from said outer cylindrical member and projecting in a downward direction of the vehicle to be opposed to said outer cylindrical member, wherein said stop and said outer cylindrical member are configured so that, when said stop is in a forced contact with said outer cylindrical member, said stop and said outer cylindrical member cause said suspension arm to be deformed by a rotation moment about a fulcrum located at a contact portion of said stop with said outer cylindrical member in such a manner that the rear end is oriented toward a predetermined direction of the vehicle.

17. The arrangement as claimed in claim 16, wherein said predetermined direction is a downwardly inclined direction of the vehicle.

* * * * *